(12) United States Patent
Carpenter

(10) Patent No.: US 6,909,395 B1
(45) Date of Patent: Jun. 21, 2005

(54) RADAR ABSORBING COATINGS

(75) Inventor: Harry W. Carpenter, Northridge, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1826 days.

(21) Appl. No.: 05/567,142

(22) Filed: Apr. 10, 1975

(51) Int. Cl.$^7$ ............................ H01Q 17/00; B32B 9/04
(52) U.S. Cl. ............................ 342/1; 427/160; 428/919
(58) Field of Search ................................ 427/160, 372; 428/539, 919; 343/18 A; 342/1

(56) References Cited

U.S. PATENT DOCUMENTS

| | | | | |
|---|---|---|---|---|
| 2,568,881 A | * | 9/1951 | Albers-Schoenberg | 428/539 X |
| 3,216,847 A | * | 11/1965 | Armant | 428/539 X |
| 3,576,672 A | * | 4/1971 | Harris et al. | 428/539 X |
| 3,810,777 A | * | 5/1974 | Boebel et al. | 427/160 |
| 3,837,910 A | * | 9/1974 | Van Der Laan et al. | 427/372 X |

* cited by examiner

*Primary Examiner*—Daniel T. Pihulic
(74) *Attorney, Agent, or Firm*—William G. Auton

(57) ABSTRACT

A method for preventing the discovery of military aircraft and missiles by enemy and infrared detectors. The method involves applying a coating of a ferrite containing glass composition to the surfaces of those metal or ceramic substrates that are susceptible to detection through their radar or infrared signature.

3 Claims, No Drawings

RADAR ABSORBING COATINGS

STATE OF GOVERNMENT INTEREST

The invention described herein may be manufactured and used by or for the Government for governmental purposes without the payment of any royalty thereon.

BACKGROUND OF THE INVENTION

This invention relates to a method for avoiding radar detection and to a radar absorbing material for use therewith. In a more particular aspect, this invention concerns itself with the application of a radar absorbing ferrite material to a radar reflecting body.

The recent advent of high altitude aircraft and missiles for military applications has generated considerable interest in the development of methods for preventing their tactical discovery by enemy radar and infrared detectors. Effective concealment can be achieved provided that the exposed surface of aircraft or missile is capable of (1) absorbing incoming radar waves and (2) have a low reflectance in the infrared spectrum. It has been found that these conditions can be met by coating the exposed surfaces with spinel ferrites having Curie temperatures in excess of 700° F. However, considerable difficulty has been encountered during attempts to satisfactorily apply the ferrites to surfaces. The coatings do not possess sufficient adhesion or the mechanical and chemical stability needed to withstand the thermal shock and vibration encountered during operation in a high altitude environment as well as the severe conditions of stress and strain associated with engine startup and shutdown.

In addition, many advanced military aircraft are equipped with missiles guided by both radar and infrared (IR) homing devices. For aft-hemisphere attack, primary return source for both microwave and infrared frequencies is the (hot) cavity of the engine exhaust. In the case of IR frequencies, radiation from hot internal engine parts can be reflected from tailpipe liner or plug surfaces (depending on engine configuration) even if these surfaces are cooled by turbine bypass air. Uncooled surfaces can of course radiate directly to increase the IR signature. For microwave frequencies, radiation transmitted from the attacking vehicle is returned in large measure from internal engine parts and flame holders through multiple reflections or propagation by wave guide modes in the engine exhaust cavity. Return of on-axis components is strongly dependent on engine exhaust design features. Components which are greater than 10°–15° off-axis generally are reflected many times inside the exhaust cavity before being re-radiated in the aft-hemisphere and are particularly susceptible to attenuation by a well designed absorber system.

In order to effectively reduce both the aft-hemisphere radar cross-section (RCS) and IR signature of an advanced military aircraft, it has been discovered that a combined high temperature radar absorbant-low infrared reflectance material in the form of a thin, non-reflecting coating of a spinel ferrite can be applied to those engine parts and structural elements that are involved in the reflection and scattering of radar signals. The coating composition can be applied to metal substrates by any well known coating technique, and is composed of a powdered mixture of a spinel ferrite and a glass frit suspended in water. In this way the desired ferrite material can be effectively bonded to metal substrate in order to prevent or minimize the detection of military aircraft and missiles by their radar or infrared signatures.

SUMMARY OF THE INVENTION

In accordance with the concept of this invention, the detection of military aircraft and missiles by radar and infrared detectors can be substantially minimized by providing engine parts and structural elements with a ferrite coating. A conventional refractory glass coating has been found to be especially effective in bonding the ferrite to a metal or ceramic substrate. The powdered glass is mixed with the ferrite in a ratio of between 5 and 50 percent by volume and suspended in water. This suspension (slip) can then be applied to metal substrates, which have been oxidized to promote adherence by conventional coating techniques, such as painting, trowling, dipping, pouring, or spraying. The coating is then dried and fired at approximately 1950° F., which is about 200° F. above the recommended firing temperature of the glass when used without ferrite additions. Adherence of the glass-bonded ferrite coating to metal substrates can be aided, if desired, by applying a thin (several mils) layer of the glass coating (without ferrite) over the metal substrate before the glass-bonded ferrite coating is applied. Thickness of the glass-bonded ferrite depends on the ferrite concentration in the coating system and on the amount of ferrite required to absorb incoming radar. Thickness as high as 100 mils have been successfully applied.

The application of a spinel ferrite to a metal or ceramic substrate in the manner discussed above has been found to be a simple, economical and effective method for preventing or minimizing the radar and infrared detection of aircraft and missiles by enemy sources.

Accordingly, the primary object of this invention is to provide a method for preventing the detection of military aircraft and missiles by their radar or infrared signatures.

Still another object of this invention is to provide a method for applying a ferrite material in the form of a coating to the surfaces of those structural elements that reflect radar signals.

A further object of this invention is to provide a radar absorbing coating that possess the mechanical and chemical stability to withstand the thermal shock and vibration associated with a jet engine or rocket motor during startup and shutdown conditions as well as during operation within a high altitude environment.

The above and still further objects and advantages of the present invention will become more readily apparent upon consideration of the following detailed description thereof.

DESCRIPTION OF THE PREFERRED EMBODIMENTS

Pursuant to the above-defined objects, the present invention involves a method of preventing the detection of military aircraft and missiles by radar and infrared detectors. These objects are accomplished by coating those metal or ceramic surfaces that reflect radar signals with a spinel ferrite. An effective bond between the ferrite and the metal or ceramic substrate is effected by using a commercial glass composition as the bonding medium. A powdered glass frit is mixed with the ferrite in a ratio of between about 5 to 50 percent by volume of glass which is then suspended in water. The suspension or slip is then applied to a metal or ceramic substrate. The substrate can be oxidized prior to bonding to promote adherence or a thin-layer of the glass frit without the ferrite addition can be applied to further aid in promoting adherence. Although the use of an oxidation technique or an ancillary glass bonding layer may be resorted to if desired, such techniques are not essential to the invention.

The suspension is applied by using conventional coating techniques such as spraying, painting, pouring, dipping or trowling. After application of the slip, the coating is then dried and fired at about 1950° F., which is about 200° F. higher than that recommended for firing the glass when used without a ferrite addition.

The thickness of the glass bonded coating depends on the ferrite concentration in the coating system and on the amount of ferrite required to absorb any incoming radar signals. However, coating thickness of up to 100 mils have been successfully applied.

The use of glass-bonded ferrite coatings ideally offers considerable flexibility in a system designed to achieve the objects of this invention. Thus, the glass matrix can be tailored somewhat in terms of physical properties to match the metal substrate, glass coatings are strong and can be made highly adherent, and the loading of the ferrite material can be varied to provide a wide choice of material properties.

On the other hand, the high firing temperature necessary application of glass coatings by conventional coating techniques poses a possible problem in ferrite reactivity with the system of molten oxides. Furthermore, ferrite concentrations at very high levels are required to meed the RAM requirements and this will eliminate much of the flexibility in total system properties. However, the particular coating compositions of this invention overcome those problems and provide an efficient system for minimizing the radar and infrared signatures of radar reflecting substrates.

The particular glass component used in fabricating illustrative examples of the ferrite containing compositions of this invention is commercially available from the Ferro Corporation of Cleveland, Ohio as coating No. 5210-2C and was initially developed as a coating for nickel alloys. Two ferrite components are used as illustrative examples. One is a nickel-zinc ferrite commercially available from the Indiana General Corporation, and designed as Ferramic H. The other ferrite is a lithium-zinc ferrite designed as TT-6-2800 which is commercially available from Trans Tech Inc.

The coatings were applied to preoxidized, one inch square Hastelloy-X coupons. The coatings were fired at 2000° F. for 1 minute or at 2200 for 15 mins and then annealed for 100 hours at 1200° F. The coatings fired at 2200° F. were glossy, adherent, and strong, indicating that the glass had matured adequately. Coatings fired at 2000° F. were somewhat semi-matte in appearance.

The fired coatings were inspected by X-ray and magnetic techniques in order to determine the compatibility of the ferrite-glass composites under the conditions of application and after long-term annealing.

As shown in Table I, the nickel-zinc ferrite/glass composite was quite stable under both application conditions and to long-term annealing. The magnetic susceptibilities of the samples were roughly 45 percent of that of pure Ferramic H, and there was no evidence of the presence of non-magnetic $Fe_2O_3$ in the X-ray patterns. However, there was some decrease in Curie temperatures of the ferrite-glass composites relative to that of pure Ferramic H. This probably results from the incorporation of non-magnetic ions ($Al^{+3}$) from the glass in the ferrite structure.

On the other hand, the lithium-zinc ferrite/glass composite underwent some decomposition even under the milder (2000° F.-1 min) application conditions as shown in Table II the coating applied at 2200° F. were non-magnetic and by X-ray the only crystalline phase present was $Fe_2O_3$. These results indicated that lithia was removed from the ferrite at high temperatures by the glass matrix.

TABLE I

HIGH TEMPERATURE COMPATIBILITY OF
FERRAMIC H/GLASS COMPOSITES

|  | Ferramic H | Ferramic H/Glass | | Ferramic H/Glass 1200° F.-100 Hours | |
| --- | --- | --- | --- | --- | --- |
|  |  | A | B | A | B |
| Lattice Constant (Å) | 8.413 | 8.418 | 8.402 | 8.423 | 8.397 |
| Principal Diffraction Lines: |  |  |  |  |  |
| 220 (Å) | 2.938(86)* | 2.938(26)* | 2.927(29)* | 2.938(33)* | 2.927(29)* |
| 400 (A) | 2.086(49) | 2.087(16) | 2.081(21) | 2.087(10) | 2.081(16) |
| 333 (Å) | 1.609(50) | 1.610(25) | 1.607(25) | 1.612(20) | 1.606(24) |
| 440 (Å) | 1.479(67 | 1.479(23) | 1.478(22) | 1.479(27) | 1.477(27) |
| $Fe_2O_3$ (%) | 0.0 | 0.0 | 0.0 | 0.0 | 0.0 |
| $T_c$ (° F.) | 406 | 383 | 374 | 360 | 315 |
| $X_r$ (%) | 100 | 45 | 46 | 42 | 45 |

*Relative Intensities
A. Applied at 2000° F. for 1 min.
B. Applied at 2200° F. for 15 min.

TABLE II

HIGH TEMPERATURE COMPATIBILITY OF
LITHIUM FERRITE/GLASS COMPOSITE

|  | TT-6-2800 | TT-6-2800/Glass | | TT-6-2800/Glass 1200° F.-100 Hours | |
| --- | --- | --- | --- | --- | --- |
|  |  | A | B | A | B |
| Lattice Constant (A) | 8.361 | 8.340 | No ferrite | 8.345 | No ferrite |
| Principal Diffraction Lines |  |  |  |  |  |
| 220 (Å) | 2.918(51)* | 2.910(10)* | — | 2.914(10)* | — |
| 400 (A) | 2.072(21) | 2.069(8) | — | 2.068(7) | — |

TABLE II-continued

HIGH TEMPERATURE COMPATIBILITY OF
LITHIUM FERRITE/GLASS COMPOSITE

|  | TT-6-2800 | TT-6-2800/Glass | | TT-6-2800/Glass 1200° F.-100 Hours | |
|---|---|---|---|---|---|
|  |  | A | B | A | B |
| 333 (A) | 1.599(34) | 1.595(7) | — | 1.596(6) | — |
| 440 (A) | 1.469(47) | 1.468(9) | — | 1.468(12) | — |
| $Fe_2O$ (%) | 0.0 | 44 | 98 | 48 | 98 |
| $T_c$ (° F.) | 1067 | 1013 | 0 | 977 | 0 |
| $X_r$ (%) | 100 | 25 | 0 | 26 | 0 |

*Relative intensities
A. Applied at 2000° F. for 1 min.
B. Applied at 2200° F. for 15 min.
The problem of retarding the decomposition of the lithium-zinc ferrite/glass of Table II was easily solved by the addition of lithia to the composite formulation in the form of lithium oxalate.

As shown in Table III, the lithia dissolution problem is eliminated by the addition of as little as 4 wt. lithium oxalate to the tetrite/glass formulation.

TABLE III

Effect of Added Lithia on Ferrite
Stability in 5210-2C Glass

| Coating No. | Lithium Oxalate Content (wt. % Added to No. 1 mix | x-ray (Crystalline Phases) | X(1%)* |
|---|---|---|---|
| 1** | 0 | 59% $Fe_2O_3$ | 34 |
| 2 | 2 | 18% $Fe_2O_3$ | 51 |
| 3 | 4 | Pure Spinel | 70 |
| 4 | 8 | Pure Spinel | 74 |
| 5 | 16 | Pulr Spinel | 56 |

*Susceptibility relative to pure ferrite
**Composition No. 1 as follows:

|  | Wt. % | Vol. % |
|---|---|---|
| 5210 frit | 16 | 20 |
| Ferrite TT-6-2800 | 84 | 80 |

The 5210-2C glass bonds strongly to Hastelloy-Z alloy yet some difficulty in consistently preparing strongly adhesive coatings when ferrite powder was added to the glass was found. It was apparent that in cases of poor adhesion, there was insufficient glass at the metal-coating interface. In order to solve this problem, a thin layer (3 mils) of pure glass was applied to the Hastelloy-X substrates before addition of the ferrite-glass coating. The adhesion of coatings applied to in this manner was consistently good. This layer is apparently enough to establish good bonding to the ferrite particles through capillarity as the layer fuses.

The nature of the microwave attenuation properties of thin coatings is such that magnetic loss properties are paramount, and thus it is imperative to maximize ferrite concentrations in the coatings of this invention. Table IV discloses thress examples of coatings having a high concentration of the ferrite component.

TABLE IV

| | COATING No. | | | | | |
|---|---|---|---|---|---|---|
| | 6 | | 7 | | 8 | No. 8 |
| Component | Vol. % | Wt. % | Vol. % | Wt. % | Vol. % | Wt. % |
| 5210 Glass | (20) | 16 | (10) | 7.5 | (5) | 3.7 |
| TT-6-2800 Ferrite | (80) | 84 | (90) | 92.5 | (95) | 96.3 |
| $Li_2C_2O_4$ | — | 4 | — | 1.9 | — | 0.9 |

These formulations were used to prepared coated substrates of Hastelloy-X and Rene 41 as well as pressed disks for a 1950° F./5 minutes firing schedule. Thus, on a weight basis, the ferrite concentration is directly evidenced in the susceptibility falues of Table 5. The lithium oxalate addition at about one-fourth the glass (wt.) content is adequate to curtail ferrite reactivity for the firing schedule. Thus Curie temperatures are relatively unaffected and $Fe_2O_3$ formation is limited to a few percent.

Table 5 discloses additional formulations of glass bonded ferrite coating systems using ferrite powders of various mesh size.

TABLE V

| | | Percent | |
|---|---|---|---|
| Coating No. | Compound | By Vol. | By Wt. |
| 9 | Glass Binder[1] | 20 | 16 |
|  | Ferrite[2] | 80 | 84 |
|  | 55% −100 mesh | | |
|  | 45% −325 mesh | | |
|  | $Li_2C_2O_4$[3] | — | 4 parts/100 parts |
| 10 | Glass Binder | 10 | 7.5 |
|  | Ferrite | 90 | 92.5 |
|  | 50% −100, +200 mesh | | |
|  | 50% −325, esj | | |
|  | $Li_2C_2O_4$ | — | 1.9 parts/100 parts |
| 11 | Glass Binder | 20 | 16 |
|  | Ferrite (same as No. 10) | 80 | 84 |
|  | $Li_2C_2O_4$ | — | 4 parts/100 parts |
| 12 | Glass Binder | 30 | 24 |
|  | Ferrite (same as No. 10) | 70 | 76 |
|  | $Li_2C_2O_4$ | — | 6 parts/100 parts |

[1]5210-2C, Ferro Corp., Cleveland, Ohio
[2]TT-6-2800
[3]$li_2C_2O_4$ was added based on a ratio of 4:1 glass to $Li_2C_2O_4$ Table VI discloses magnetic susceptibilities and curie temperature of glass bonded coatings from Table V.

TABLE VI

| Coating No. | Susceptibility[a] (%) | Curie Temp. (° F.) |
|---|---|---|
| 9 | 65 | 1040 |
| 10 | 79 | 1049 |
| 11 | 69 | 1022 |
| 12 | 65 | 1013 |

[a]relative to ferrite starting material

Formulations no. 9 and no 11 are similar exeept that the particle size distribution of the ferrite powder was slightly different. The course fraction of powder in No. 9 was −100 mesh, while that in No. 11 was −100, +200 mesh.

Formulations Nos 10,11 and 12 show the effect of increasing amounts of glass binder, viz., 10, 20, and 30 percent by volume, respectively. The most significant observation is the somewhat high porosity in all coating systems. Some of the large black holes in the coating are caused by grains that pulled out during the polishing operation, yet many are simply due to the poor packing of the larger ferrite grains.

Four glass-based coatings were tested in a flame tunnel-corrosion/erosion test facility. Two compositions were used, no.6 and no.7, each coated on Rene 41 and Hastelloy-X.

Visual inspection of the samples after the test revealed no color changes, and little damage save a small piece cracked from the no. 6 composition. Samples were broken from the coatings and crushed for X-ray and magnetic measurements, with the results shown in Table VII. It is of interest to note here that both the samples coated on Rene shown a greater ferrite decrease than those on Hastelloy although the absolute levels may not be too accurate. This correlates with the lower susceptibilities observed and may indicate some involvement of the surface metal layers with the coating through migration at the elevated temperature. Overall, however, the results are good in view of the length and severity of the test.

radar and infrared signatures of military aircraft vehicles and missiles is significantly reduced.

While there have been described herein what are considered to be preferred embodiments of the invention, it will be obvious to those skilled in the art that modifications and changes can be made without departing from the essence of the invention. It is to be understood, therefore, that the exemplary embodiments are illustrative only and are not to be construed as limiting the invention, the scope of which is defined by the appended claims.

What is claimed is:

1. A method for minimizing the reflection of microwave radiations from surfaces which normally reflect such radiations comprising the steps of applying to said surfaces a thin coating material composed of a composite mixture of about 50 to 96 weight percent of a radar absorbing spinel ferrite selected from the group consisting of nickel-zinc-ferrite and lithium-zinc-ferrite with the balance of said coating material substantially all glass frit bonding agent and then firing said coating material at a temperature of about 1950° F. for a period of about 5 minutes to form a radar reflecting surface.

2. A method in accordance with claim 1 wherein said coating material further includes the addition of from about one to 6 weight percent of lithium carbonate.

3. In combination with a normally radar reflecting surface, a thin layer bonded to said surface for minimizing the reflections of radar signals that normally impinge upon said surface, said layer composed of a composite mixture ofabout 50 to 96 weight percent of a radar absorbing spinelferrite selected from the group consisting of nickel-zinc-

TABLE VII

RESULTS OF FLAME TUNNEL TEST (1200° F.) OF FERRITE COATINGS

| Coating | Coating Composition Pts. by Wt. | Thickness (mils) | Substrate | Magnetic[a] Susceptibility(%) | Curie Temp. (° F.) | X-Ray Analysis | Remarks |
|---|---|---|---|---|---|---|---|
| # 6 | 84% Li—Zn Ferrite 16% Glass 4% Li$_2$C$_2$O$_4$ | 40 | Hastelloy | 70 | 995 | 86% Ferrite 14% Fe$_2$O$_3$ | 1. Coating Black 2. ⅛" × 1" chipped off |
| # 6 | — | 37 | René | 66 | 1049 | 74% Ferrite 26% Fe$_2$O$_3$ | 1. Coating Black 2. ⅛" × 1" chipped off |
| # 7 | 92.5% Li—Zn Ferrite 7.5% Glass 1.9% Li$_2$C$_2$O$_4$ | 36 | Hastelloy | 75 | 1049 | 84% Ferrite 16% Fe$_2$O$_3$ | 1. Coating Black 2. Coating intact |
| # 7 | — | 33 | René | 67 | 1058 | 79% Ferrite 21% Fe$_2$O$_3$ | 1. Coating Black 2. Coating intact |

[a]Susceptibilities are relative to pure ferrite, TT-6-2800

From a review of the above, it can be seen that the present invention provides an efficient and simple method for applying ferrite materials to metal and ceramic substrates that are susceptable to detection by radar and infrared detectors. The ferrite and lithium-zinc-ferrite with the balance of said composite mixture being a glass frit bonding agent.

* * * * *